(Model.)
C. H. THOMAS.
NUT LOCK.
No. 435,126. Patented Aug. 26, 1890.
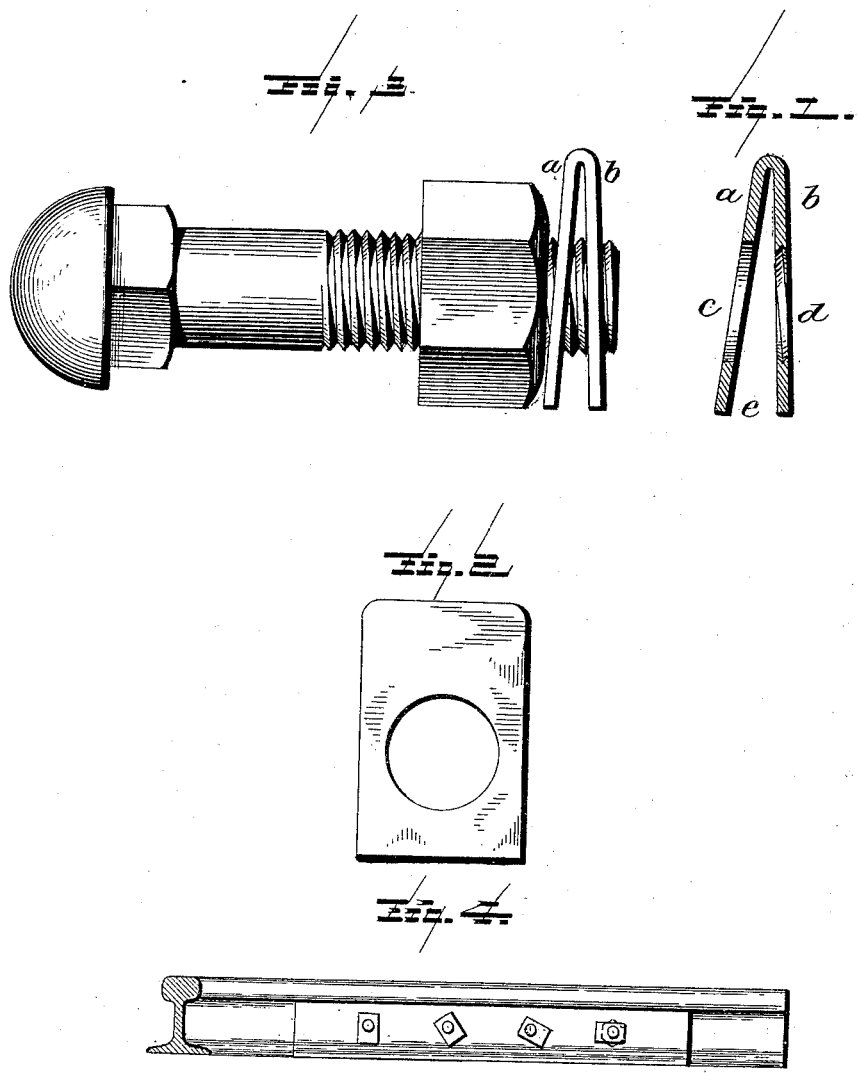
Witnesses
L. C. Hills
E. H. Bond
Inventor
C. H. Thomas;
E. B. Stocking
Attorney

UNITED STATES PATENT OFFICE.

CHARLES H. THOMAS, OF MONCTON, NEW BRUNSWICK, CANADA, ASSIGNOR, BY MESNE ASSIGNMENTS, TO THE AMERICAN NUT-LOCK COMPANY, OF MAINE.

NUT-LOCK.

SPECIFICATION forming part of Letters Patent No. 435,126, dated August 26, 1890.

Application filed July 12, 1889. Serial No. 317,366. (Model.)

*To all whom it may concern:*

Be it known that I, CHARLES H. THOMAS, mechanic, a citizen of the Dominion of Canada, residing at the town of Moncton, in the county of Westmoreland, in the Province of New Brunswick and Dominion of Canada, have invented a new and useful Nut-Lock, called the "Thomas Universal Spring Nut-Lock," (for which I have applied for a patent of the Dominion of Canada simultaneously with this application, and not elsewhere), of which the following is a specification.

My invention relates to nut-locks which screw onto the bolt after the nut.

The object of my invention is to secure and hold fast the nuts on bolts of any size, placed in any position, in any climate or condition and in any place, work, or structure where bolts with nuts screwed on may be used, and to so secure and hold the nut that it will not move or shake off, but remain firmly in position. I attain this object by the appliance illustrated in the accompanying drawings, in which—

Figure 1 is a longitudinal section of the entire appliance or article. Fig. 2 is a top view or plan of article. Fig. 3 shows a side view of the article as applied to an ordinary railway-track bolt partially screwed on. Fig. 4 shows the side view of an ordinary fish-plate attached to rail at joint with the locks placed in position, screwed on the bolt after the nut.

Similar letters refer to similar parts throughout the several views.

The appliance or article may be made of steel, iron, brass, or any metal or combination of metals that will give sufficient spring and strength, and of a width and thickness that may be suitable for the size of the bolt and the work or structure in which the bolt may be used. It may be constructed by punching or making two holes C and D in the metal and bending or folding the strip forming the two members A and B in the hole D in one member, as B. A thread is run of the same size as the thread on the bolt on which it is intended to be used, and the hole C in the other member, as A, is without a thread and of a size so as to clear the thread on the bolt. The opening of the spring at E is made so as to suit the different sizes of bolts on which it may be used and the strength of spring required.

The article is applied in use by placing the member A, containing hole C without the thread, on the inside or next the nut and securing the lock by means of the thread in hole D in member B up tight against the nut, so as to compress the two members A and B, which may be brought in contact, if required.

In applying my invention to large bolts in heavy structures, I prefer to use an ordinary washer between the nut and my lock.

Having fully described my invention, what I claim, and desire to secure by Letters Patent, is—

1. A nut-lock consisting of a spring-metal plate bent upon itself to form diverging resilient portions, each provided with openings, one screw-threaded, to engage the threads of a bolt, and the other of greater diameter than that of the bolt, substantially as specified.

2. The combination, with the bolt and nut, of a spring-metal retainer independent of the nut, formed of a single piece of spring metal bent into substantially V shape in cross-section and arranged upon the bolt outside the nut, and having in its outer arm or portion an opening screw-threaded to engage the threads of the bolt, and its inner arm or portion formed with an opening of greater diameter than that of the bolt, substantially as specified.

CHARLES H. THOMAS.

Witnesses:
EDWARD GEROUARD,
JOHN S. COVERT.